United States Patent [19]

Nguyen

[11] Patent Number: 5,570,359
[45] Date of Patent: Oct. 29, 1996

[54] OSI TRANSPORT RELAY SYSTEM BETWEEN A NETWORK IN CONNECTED MODE AND A NETWORK IN NON-CONNECTED MODE

[75] Inventor: VanPhuong Nguyen, Les Mureaux, France

[73] Assignee: Bull S.A., Paris, France

[21] Appl. No.: 19,861

[22] Filed: Feb. 19, 1993

[30] Foreign Application Priority Data

Feb. 21, 1992 [FR] France ................................. 92 02048

[51] Int. Cl.$^6$ ............................. H04L 12/46; H04L 12/56
[52] U.S. Cl. ....................... 370/60; 370/85.13; 370/94.1
[58] Field of Search ........................... 370/60, 60.1, 61, 370/85.13, 85.14, 94.1, 92, 110.1, 94.3; 340/825.52; 395/325

[56] References Cited

U.S. PATENT DOCUMENTS

| | | | |
|---|---|---|---|
| 4,941,089 | 7/1990 | Fischer | 370/85.13 |
| 5,134,610 | 7/1992 | Shand et al. | 370/85.13 |
| 5,245,608 | 9/1993 | Deaton et al. | 370/94.1 |

OTHER PUBLICATIONS

"Lan/Wan Interworking in the OSI Environment", H. J. J. H. Schepers, et al, vol. 23, No. 4, Computer Networks and ISDN Systems, Amsterdam, Netherlands, Jan. 1992, pp. 253–266.

"Networking of Networks: Interworking According to OSI", F. M. Burg, et al., vol. 7, No. 7, IEEE Journal on Selected Areas in Communication, New York, U.S.A., Sep. 1989, pp. 1131–1142.

Primary Examiner—Benedict V. Safourek
Assistant Examiner—Chau T. Nguyen
Attorney, Agent, or Firm—Weingarten, Schurgin, Gagnebin & Hayes

[57] ABSTRACT

A system of at least one OSI transport relay ensuring cooperation between at least a first system containing at least one source system (SS), using an OSI transport profile based on a network service in connected mode, called CONS, and at least a second system including at least one target system (SD) using an OSI transport profile based on a network service in non-connected mode, called CLNS, with the information routed on the transport layer. According to the invention, the system characterized by the fact that the addresses of the transport service access points TSAP of the source and target system ($TSAP_S$ and $TSAP_D$) are transported end to end by the transport layer, in connection requests TPDU-CR, and the addresses of the network service access points used by the network service are those of the source and relay systems ($NSAP_S$ and $NSAP_R$). The invention is application to telecommunications networks.

5 Claims, 6 Drawing Sheets

OSI TRANSPORT RELAY SYSTEM BETWEEN A NETWORK IN CONNECTED MODE AND A NETWORK IN NON-CONNECTED MODE

SUMMARY OF THE INVENTION

This invention concerns an OSI transport relay system that allows cooperation between at least one first system using an OSI transport profile (Open Systems Interconnection) based on a network service in connected mode called CONS (Connected Oriented Network Service) and a second system using an OSI transport profile based on a network service in non-connected mode called CLNS (Connection Less Network Service). More specifically, it is applicable to the interconnection of a first system, for example an X-25 type or TRANSPAC operating in connected mode, and a second system based on a network service in non-connected mode, like Ethernet for example.

It is known that modern teleprocessing and telematic networks operate on the same standard model for open systems interconnection, known by the name OSI standard model, which defines the architecture of these networks in standardized layers. This standardization has been adopted jointly by the ISO (International Standards Organization) and the CCITT (Comité Consultatif International tél égraphique et téléphonique—International Telephone and Telegraph Consultative Committee). The architecture of the OSI model is composed of a stack of 7 layers of activities; the lowest layer (layer 1) is for the physical transmission of signals between the different systems through the physical interconnection support (which may be composed of coaxial cables, fiber optic cables, twisted pairs, etc.), while the upper layer (layer 7) is for the functions performed by the application programs and the users of the teleprocessing network.

The basic roles of each of the 7 layers are listed below:

Layer 1, called the "physical layer" makes the physical interconnection between the different circuits used to transport the signals for the binary information, Layer 2, called "data link layer" manages the data frames and may detect and recover errors between adjacent open systems, Layer 3, called the "network layer," relays different packets of data and routes them to the target system, Layer 4, called the "transport layer" is basically designed to perform end-to-end checks and to optimize data transport between the source and target systems (data transmitting and receiving systems). This layer always operates end to end, which means that the transport layer of the initiating system (the system that requests the connection to send data) communicates directly, i.e., without an intermediary, with the equivalent transport layer of the receiving system. This is true from the standpoint of the transport protocol, but quite obviously this information used only by the transport layers is transported physically by the other lower layers 1, 2, 3. The transport layer is the first layer to work end to end. The lower layers do not work like this, which means that the intermediate systems between the initiating system and the receiving system can dialogue with one another in the lower layers 1, 2, 3.

Layer 5, called the "session" layer, is responsible for initializing, synchronizing and terminating the dialogue between the source and target systems. This layer therefore sets up the dialogue between the systems and terminates it.

Layer 6, called the "presentation" layer, is responsible for problems associated with presenting information that the applications wish to exchange or manipulate.

The application layer, called layer 7, handles all functions necessary for systems applications that are not supplied by layer 6.

The OSI model also defines the basic concepts for describing the function of each layer and the relations between adjacent layers. The functions of the layer (N) are performed by entities (N) within the open systems on the network in question. Thus, the functions of the transport layer are performed by transport entities. Interface between the entities (N) is handled by all the layers with an index below N. Thus, the interface between the transport entities (layer 4) of the source system (SS) initiating the connection, and the interface of the target system (SD) is handled by all of the layers 1, 2, 3 in each of these systems. This latter interface is made available to the transport entities of layer 4 in the form of an interaction service, more commonly called service, here network service (layer 3).

The basic mode of this interaction service can be the connected mode, called CONS, in which a connection (N–1) must have been established between the entities (N) for them to be able to communicate. The OSI model also defines communication in non-connected mode called CLNS.

The service (N–1) is offered by entities (N–1) to entities (N) at service access points, more commonly designated by the acronym SAP. Thus, the service offered by the transport entities (layer 4) to the session entities (layer 5) is offered at Transport Service Access Points. Indeed, a TSAP address is perfectly defined by the pair of addresses composed of TSel and NSAP. Thus, for the source system, it is called $TSAP_S$, while for the target system it is called $TSAP_D$. A value of T-Sel (Transport Selector) makes it possible to select one session entity from the others.

The service offered by the network entities (layer 3) to the transport entities (layer 4) is offered at network service access points called NSAPs. Thus, it can be seen in FIG. 1 that the transport service access point of the session of the source system SS is defined by an address $T\text{-}Sel_S$, with the network service access point of the transport entity of the source system defined by the address $NSAP_S$. Similarly, for the target system SD, the transport service access point for the session is defined by the address $T\text{-}Sel_D$, while the access point of the transport entity of the same system to its network service is defined by the address $NSAP_D$.

When the value of NSAP is the same, there may be 2 or even more sessions defined by different values of T-Sel (consequently for the same transport entity). Similarly, there is a correspondence between a set transport entity and a value of NSAP. However, at one and the same transport entity, several values of NSAP can correspond, depending on the different types of networks, in connected or non-connected mode, having different physical attachments, etc.

The values of T-Sel are transported by the transport layer end to end, while the values of NSAP can be used by the intermediate systems. However, all of these values are transported physically through layers 1, 2, 3 of the source and target systems SS and SD through the network NW. The network service is what chooses the physical path used by the data between the source system and the target system; this path can be any one of the paths $CH_1$, $CH_2$, $CH_3$, as can be seen in FIG. 1.

When a connection is established between a session of the source system SS and a session of the target system SD, the source system sends a transport connection request to the target system. This connection request translates into sending a message called a TPDU-CR, which is the English acronym for Transport Protocol Data Unit Connection Request, which includes the value of the transport selector of the source and target systems, i.e., $T\text{-}SEL_S$ and $T\text{-}SEL_D$. Before the connection is established, the transport entity of the source system SS gives the network service the addresses $NSAP_S$ and $NSAP_D$. The network service then opens the route to the connection and performs the routing function using the NSAP addresses provided. Once this has been done, the connection request TPDU-CR is sent to the network layer and thus constitutes a packet of information to be sent. Once the negotiation between the source and target systems is terminated and the connection is finally established, no TPDU-CR and consequently no value of T-Sel is transmitted. From that time on, only the NSAP addresses are used, i.e., $NSAP_S$ and $NSAP_D$, in the network layers in non-connected mode.

Very large firms with many offices and branches use computer systems in each of them that are connected to one another by networks working in both connected and non-connected mode. This is true, for example, of the large energy producers and distributors. Each of these companies has a large number of electric power stations and a large number of research and study offices, as well as various branches distributed throughout the area that the company serves. This is illustrated in FIG. 2. It has a certain number of computer systems connected by a network R1 that connects several systems together $S_{10}$, $S_{11}$, $S_{12}$, etc. using network services in non-connected mode, for example services of a standardized network like Ethernet (ISO 8802-3). It also has other networks connecting computer systems in various offices, for example R2, which connects the computer systems $S_{20}$, $S_{21}$, $S_{22}$, $S_{23}$, etc., which also operate in non-connected mode. And it has still other systems $T_1$, $T_2$, $T_3$, $T_4$, etc. All networks like $R_1$, $R_2$ and systems like $T_1$, $T_4$ communicate with one another through a network $R_0$ that operates in connected mode, a network like TRANSPAC, for example.

If system $T_1$ wants to communicate as a source system $SS_1$ with a system on network $R_1$, it therefore goes through network $R_0$, then through network $R_1$ and consequently from a network service operating in connected mode to a network service operating in non-connected mode.

The connected service mode CONS is based on the network services and protocols defined in ISO standards 8878 and 8208 (or CCITT X-25), while the non-connected mode CLNS is based on the network services and protocols defined by ISO standard 8473, including ISO standard 9542 which defines the associated routing mechanisms and protocols.

In operating mode, the network services in connected and non-connected mode are based on two sets of protocols, which are completely mutually incompatible. A system using an ISO transport profile based on a CONS network service, such as $R_0$ therefore cannot work with a system using an ISO transport profile based on a network service like CLNS, such as network $R_1$.

Several techniques have been developed to allow such systems based on mutually incompatible network services to work together. They are based on relays at the level of the transport entity. Corresponding transport relays have therefore been defined and, for example, proposed by the European organization SPAG, which has defined the SPAG-type relay (SPAG is the English acronym for Standards Promotion and Application Group, which includes twelve European manufacturers). This relay technique is defined in the document called GUS3.1. (GUS is the English acronym for Guide for Use of Standard) through two recommendations called R31 and R32 that define relays between a transport profile on a CLNS-type network service and a transport profile on a CONS-type network service, respectively, relative to two variations of the same CLNS-type protocol (a variation called Inactive Subset or IPNL and a variation called Full Subset).

The SPAG relay technique is based on specific formats for T-Sel transport selectors that make it possible to obtain the address of NSAP and the true value of the transport selector T-Sel of the target system; the relay system uses this information to make the connections. The relay system can, for example, be called $SPAG_1$, shown in FIG. 2 between networks $R_1$ and $R_0$. It can also be the relay $SPAG_2$ located between networks $R_0$ and $R_2$.

This technique forces the relay system to have a table of correspondence that allows it to use, on the basis of the NSAP and T-Sel values it receives, and to deduce a new value of NSAP and T-Sel to extend the connection request.

The disadvantage of this system is to introduce too high a degree of stress, since it is necessary to ensure coherence between the different tables of correspondence of the different relay systems all along the data path. Moreover, it is difficult to use more than two successive relay systems.

There is also another transport relay technique that is known as MSDSG (Multi System Distributed System Gateway); relays $MSDSG_1$ and $MSDSG_2$ in FIG. 2 correspond to it (as a substitute for the corresponding $SPAG_1$ or $SPAG_2$ relays). This relay technique handles routing at the level of the transport entity on the basis of the NSAP addresses given to it by the network layers.

This technique includes a number of disadvantages if several levels of relays are used simultaneously: relays at the network and transport level. It also has problems associated with the use of dynamic routing protocols (for example, ISO 9542) and in cases of parallel relay systems: transport reference collision problems occur, as well as problems on simultaneous routing paths. These various disadvantage will be better understood by referring to the description and FIGS. 3, 4 and 5.

This invention makes it possible to eliminate these disadvantages and is based on an addressing concept using the TSAP addresses at the level of the ISO transport layer (transported by the TPDU-CR), with the NSAP address called able to choose a set of paths to reach the target system.

According to the invention, the system of at least one OSI transport relay ensuring cooperation between at least one first system containing at least one source system, using an OSI transport profile based on a so-called CONS network service in connected mode, and a second system including at least one target system, using an OSI transport profile based on a so-called CLNS network service in non-connected mode, with information routed on the transport layer via transport selector values T-Sel relative to the target and source systems, and by network service access point addresses of the source and target systems, is characterized by the fact that the addresses of the transport service access points TSAP of the source and target systems are transported end to end by the transport layer in the connection requests TPDU-CR; the addresses of the network service access points used by the network services are those of the source systems and the relay.

Other characteristics and advantages of this invention will appear in the following description, which is given as a non-limiting example, and with reference to the appended drawings. In the drawings:

DESCRIPTION OF THE PREFERRED EMBODIMENT

To gain a better understanding of the structure and operation of the system of at least one BDSG-type transport relay according to the invention, it is useful to refer to the structure and operation of the MSDSG-type transport relay system according to the prior art, which is described in the reference "Position Paper and Solution for CONS-CLNS Interworking" dated Nov. 16, 1987 published by the association of American builders and manufacturers called MAP/TOP.

Figure 1:
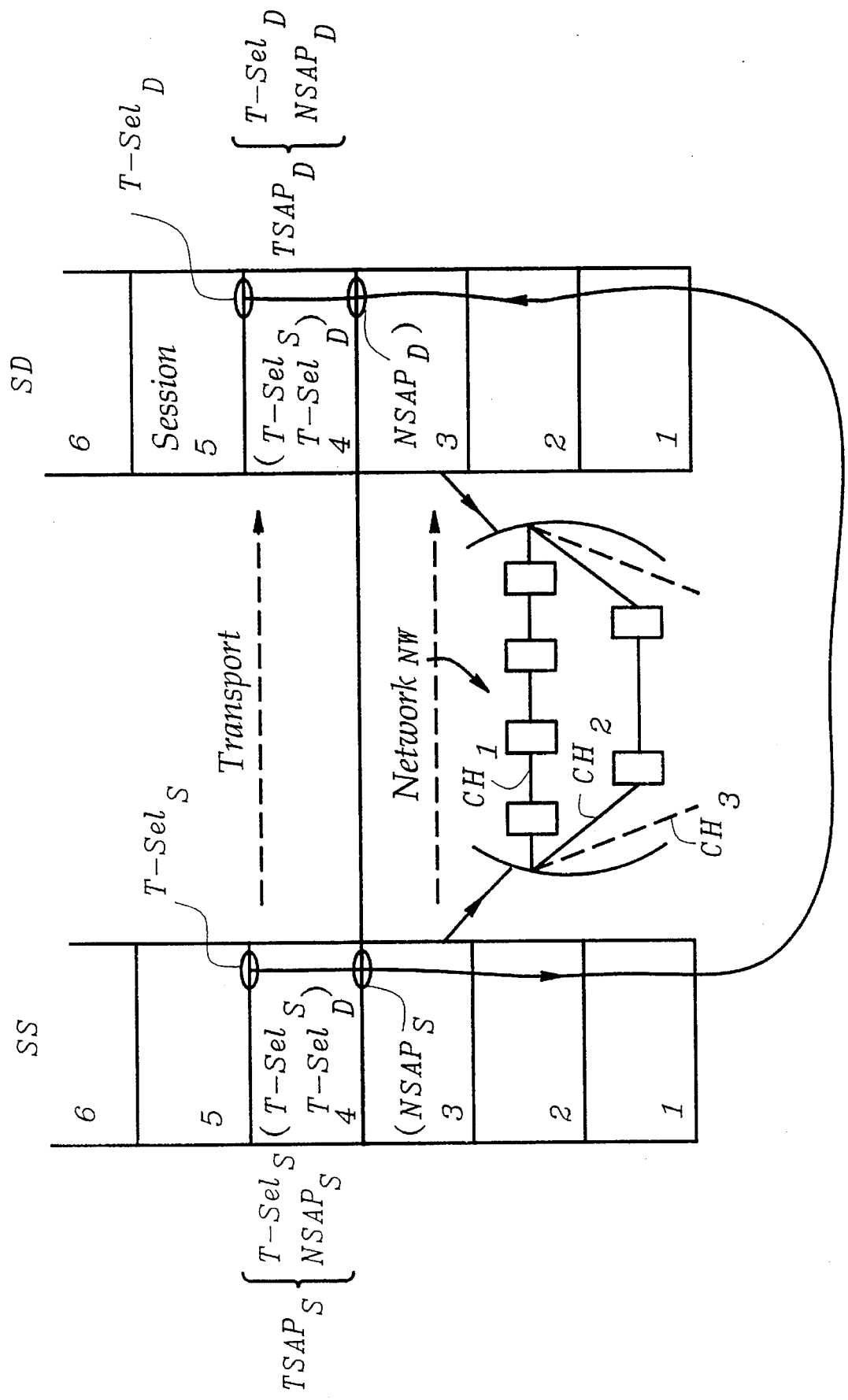
FIG. 1 shows how the OSI reference model is composed.
Figure 2:
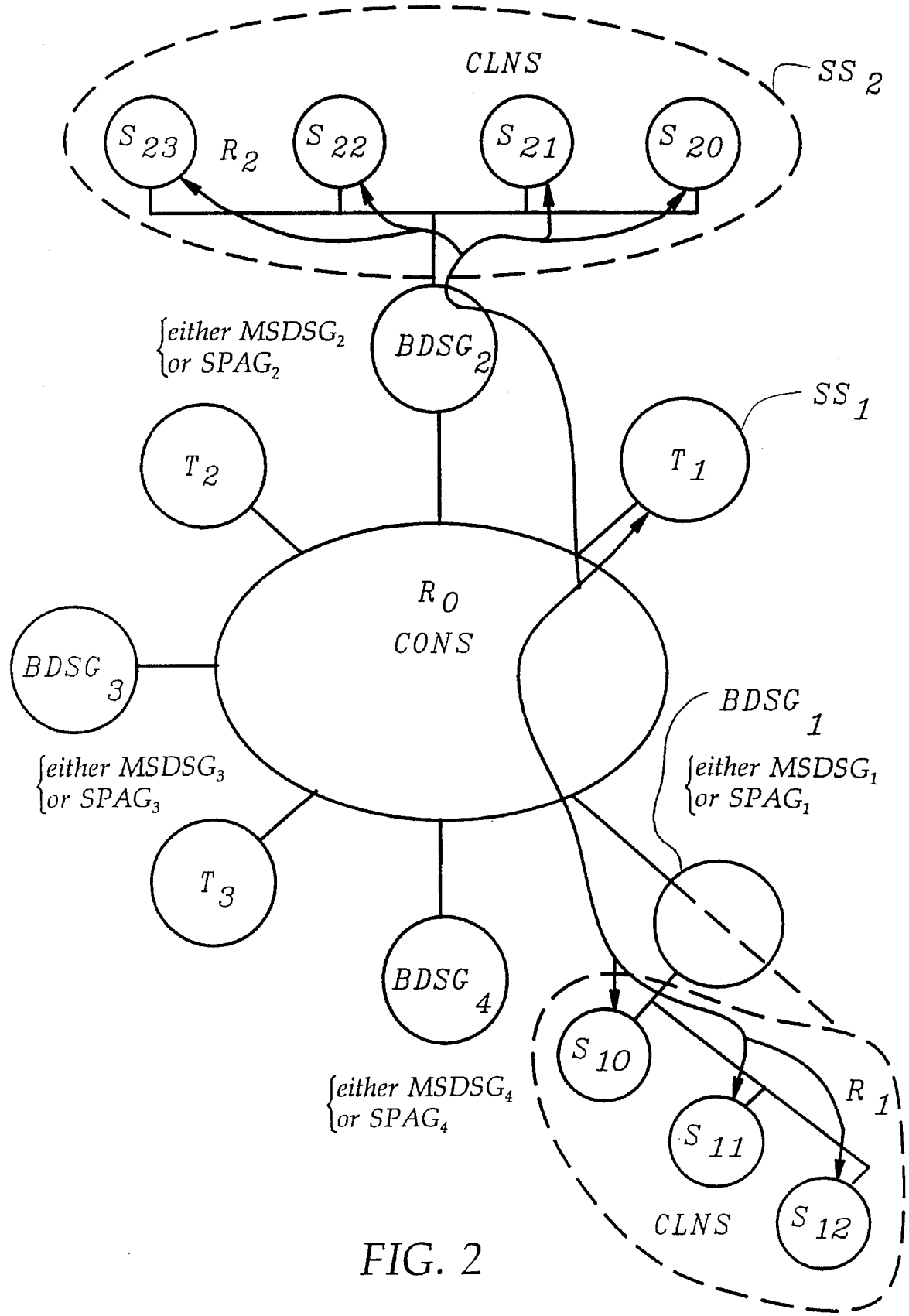
FIG. 2 shows a group of computer systems connected together by network services of the connected type CONS and non-connected type CLNS, using transport relay systems that can be those of the prior art or those in the invention.
Figure 3A:
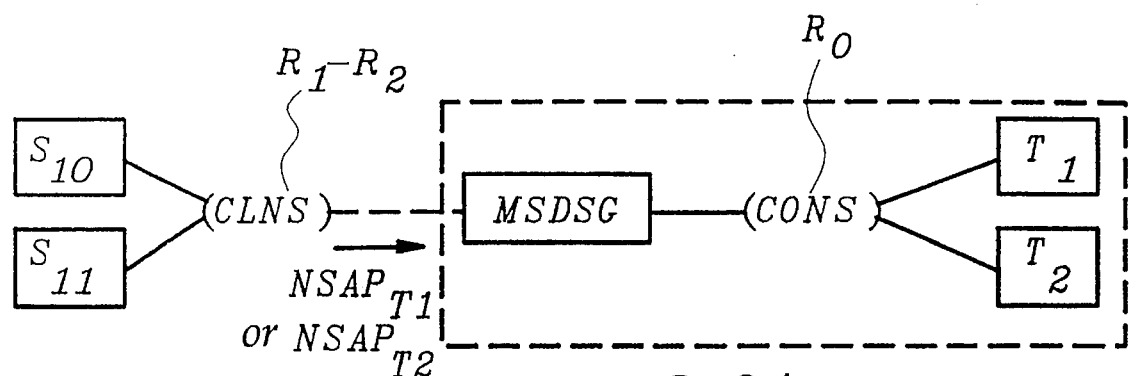
FIGS. 3A and 3B show the overall structure of an MSDSG-type transport relay system according to the prior art.
Figure 3B:
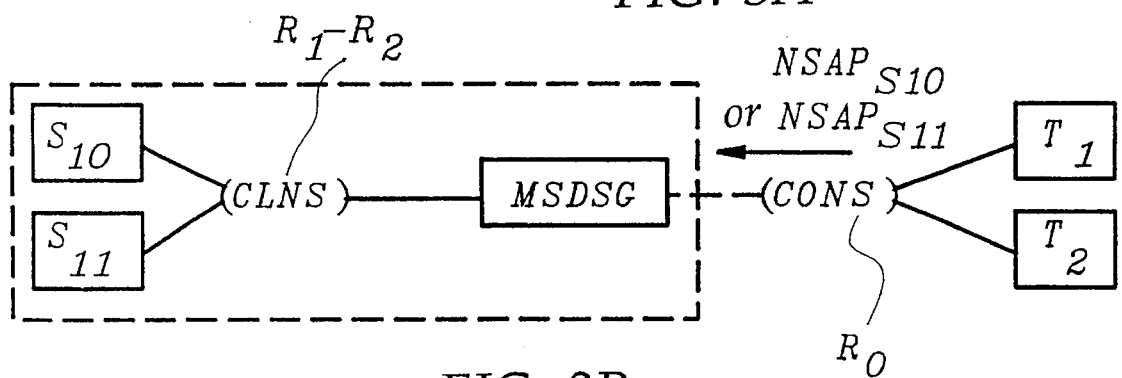
Figure 5:
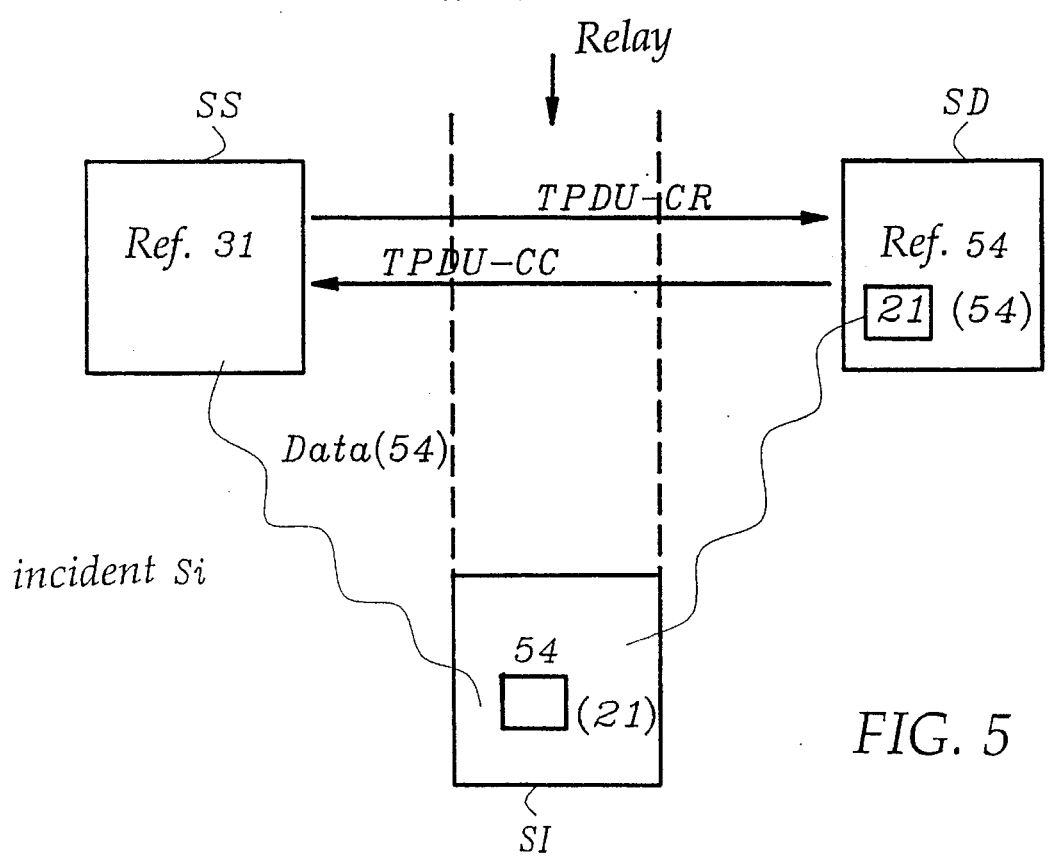
FIG. 5 shows the disadvantages of the MSDSG-type transport relay system according to the prior art.
Figure 4:
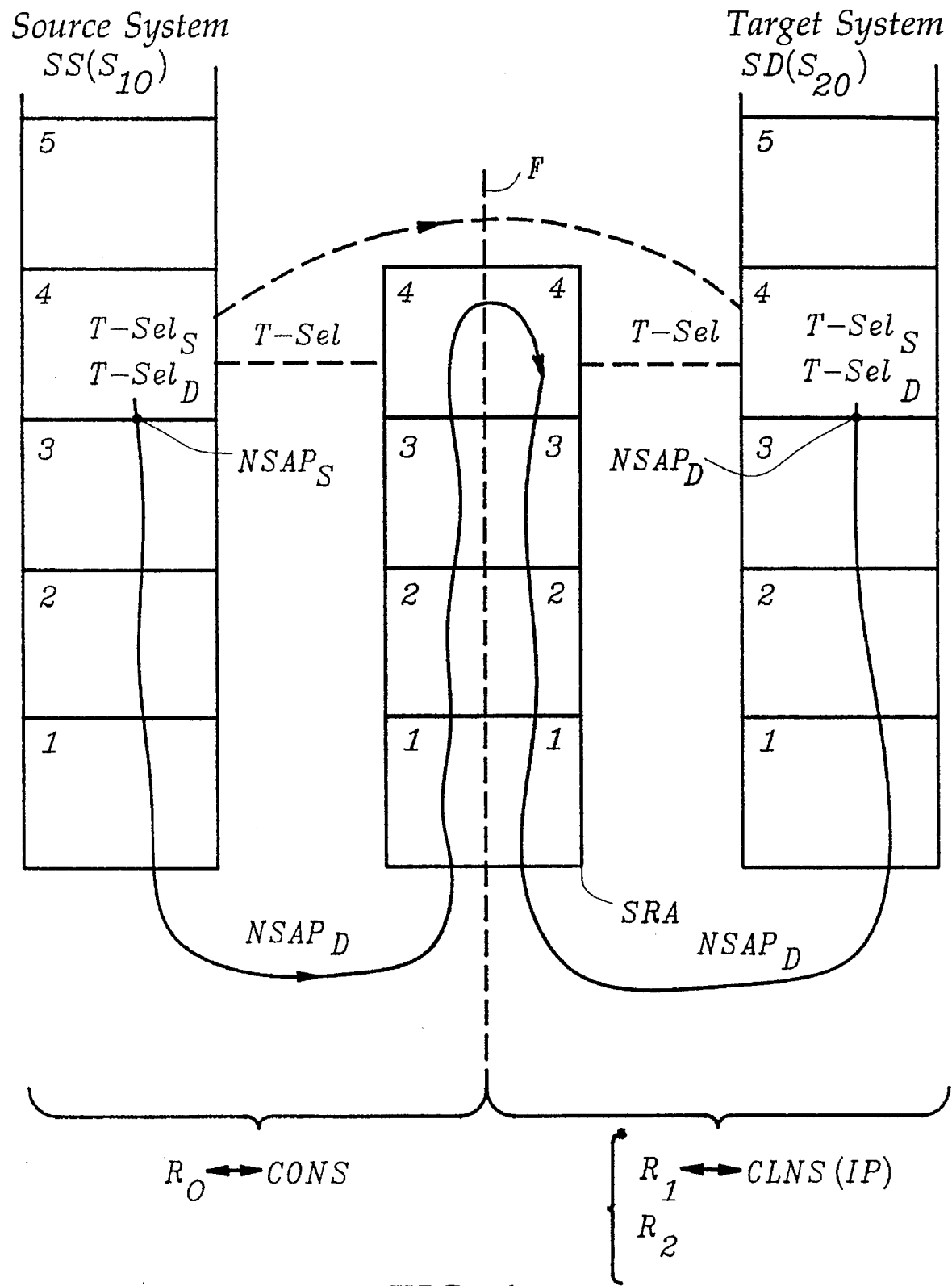
FIG. 4 shows how a transport relay system according to the prior MSDSG art operates in representation mode with layers of the OSI model.

As was stated earlier, the MSDSG-type transport relay technique illustrated by FIGS. 3 to 5 is based on the management and assignment of NSAP addresses. In such a relay system, systems on CONS-type networks, for example network $R_0$ in FIG. 2, are configured on output paths using the X25-84-based network service, and CLNS-type systems, for example networks $R_1$, $R_2$ are configured on output paths using the INTERNET-FULL layer, which is the case for ETHERNET-type networks, for example.

If we look at FIG. 3A, we see that, seen from the CLNS world, i.e., seen from any system such as $S_{10}$, $S_{11}$ on $R_1$, all CONS-type systems located behind the MSDSG transport relay, i.e., all systems like $T_1$, $T_2$ connected to the network $R_0$, are seen as accessible from the standpoint of their NSAP addresses via this MSDSG-type relay.

Conversely, for a system belonging to the CONS world, any system belonging to the CLNS world and served by MSDSG-type relays, is seen as accessible from the standpoint of its NSAP address, via the latter.

Consequently, in a relay system, for example MSDSG1, a connection request coming from the CLNS world that has the NSAP target address of the CONS world, for example the NSAP address of system $T_1$ or $T_2$ will be moved up to the relative transport layer in the CLNS world, which backs the connections up to the transport layer of the CONS world and thus extends the connection.

Conversely, a similar algorithm applies to a connection request coming from the CONS world to extend the connection to the CLNS world, by using the NSAP address, for example, of the target system $S_{10}$ or $S_{11}$.

The two transport connections backed up to one another in the transport relay system according to MSDSG are independent from the standpoint of the protocol elements, whether they be class of transport, credit, window and various possible options. Another way of understanding how the MSDSG-type SRA transport relay according to the prior art operates is shown in FIG. 4. Each of the systems, whether it is the source system SS, shown for example by system $S_{10}$, the relay system SRA or even the target system SD shown for example by system $S_{20}$, is shown there in the form of a stack of layers in the OSI reference model.

In FIG. 4, to simplify things, only the group of layers 1 to 5 is shown.

Thus, as stated above, the two values of T-Sel for the source and target systems, namely T-Sel$_S$ and T-Sel$_D$ are transported by the transport layer end to end.

The border F between the two CONS-type and CLNS-type networks goes through the middle of the SRA relay. Remember that on both sides of this border, no dialogue is possible between the network layers 3 (since one needs a connection to work, while the other does not need one). To be able to make the connection, it is necessary to go through a layer which, in terms of operation, is common to both worlds. This can be done only at the level of the transport layer. Thus, it will go from the system SS to the relay SRA and back down from layer 4 to layer 1 of the source system, then go from layer 1 to layer 4 of SRA of the CONS world. It thus reaches the transport layer of the SRA and then goes back down to network layer 3 of the CLNS world. In this case, layer 4 of the relay system is an intermediate transport layer between the transport layers of the source and target systems. Either NSAP$_D$ addresses it from the network service access point of the target system SD, which is provided by the session of the source system SS. The transport entity of the source system dialogues with the transport entity of the relay SRA (there is end to end control between the source system and SRA). When SRA receives a connection request at the level of its transport layer, it tries to relay it to the target system SD. As soon as it sees the address NSAP$_D$ arriving, it interprets this data as identifying its own transport layer and makes it move up to it; NSAP$_D$ is thus recovered to extend the connection and is therefore sent by the relay system SRA via its layers 4, 3, 2, 1 to the layers 1, 2, 3, 4 of the target system SD. It should be noted that during this time, the values T-SEL$_S$ and T-Sel$_D$ are used at the level of the transport entities, while the values NSAP$_S$ and NSAP$_D$ are used at the network level.

We can see therefore that in the MSDSG-type relay system, the transport entity handles the routing on the basis of NSAP$_D$, which is normally used in network layer 3, according to the OSI reference model.

Look at FIGS. 3B and 5, which illustrate the problems that occur with MSDSG-type relays.

FIG. 5 shows a source system and a target system SS and SD which exchange connection requests TPDU-CR and TPDU-CC. We know that the TPDU-CR or TPDU-CC (the letters CC stand for Connect Confirm) contain the transport selectors and a set transport reference. Thus, in FIG. 5, the source system SS has a reference 31, while the target system has a reference 54; consequently, in the TPDU-CR, the source system SS indicates its reference, i.e., 31, and in the TPDU-CC, the target system SD indicates its reference, i.e., 54 (these references are for the open transport connection). There is therefore a pair of references (54, 31) or (31, 54). If there is an interruption in the connection on the normal path used between the source and target systems, they can go through an intermediate system SI, which can accept the connection with the source system SS if it has the same reference as the target system SD, i.e., 54. But that does not mean that SI interprets the reference 54 as being targeted to the target system SD, if it has the same reference 54 corresponding to a transport connection with a system other than SD. In this case, we will say that there is a reference collision, and the intermediate system SI will be able to forward the connection data to a system other than SD.

Figure 6:
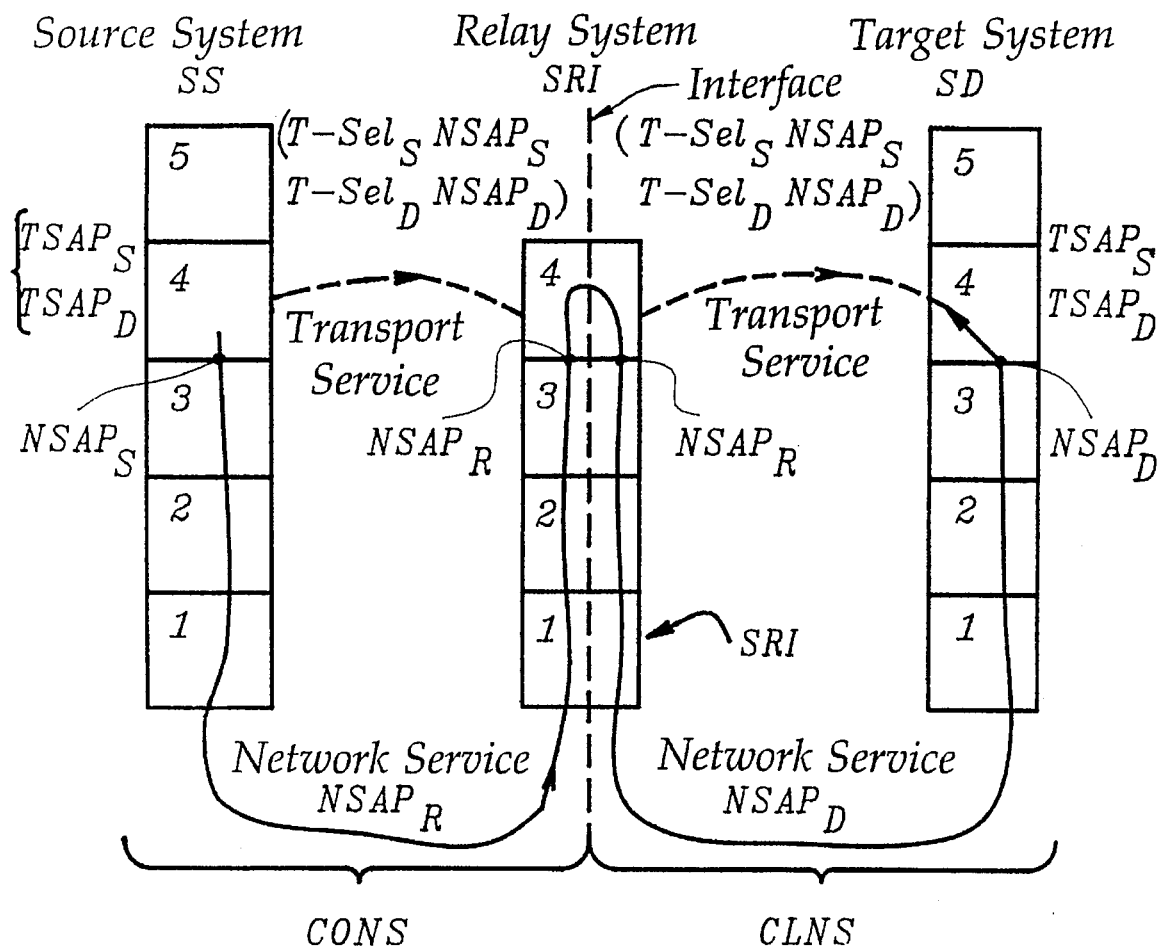
FIG. 6 shows how the system of at least one transport relay works according to the invention, with the target and source systems and the relay shown in layers according to the OSI reference model.

Now let's consider FIG. 6 which shows how the relay system SRI according to the invention operates. To illustrate this operation, the source system SS, the relay system SRI and the target system SD are shown in the form of their stacks of layers in the OSI reference model. As in FIG. 4, we are assuming that the network used between SS and SRI operates in connected mode CONS, while the network operates in non-connected mode CLNS between SRI and SD. Such a relay is called BDSG-type (Bull Distributed System Gateway).

Figure 7:
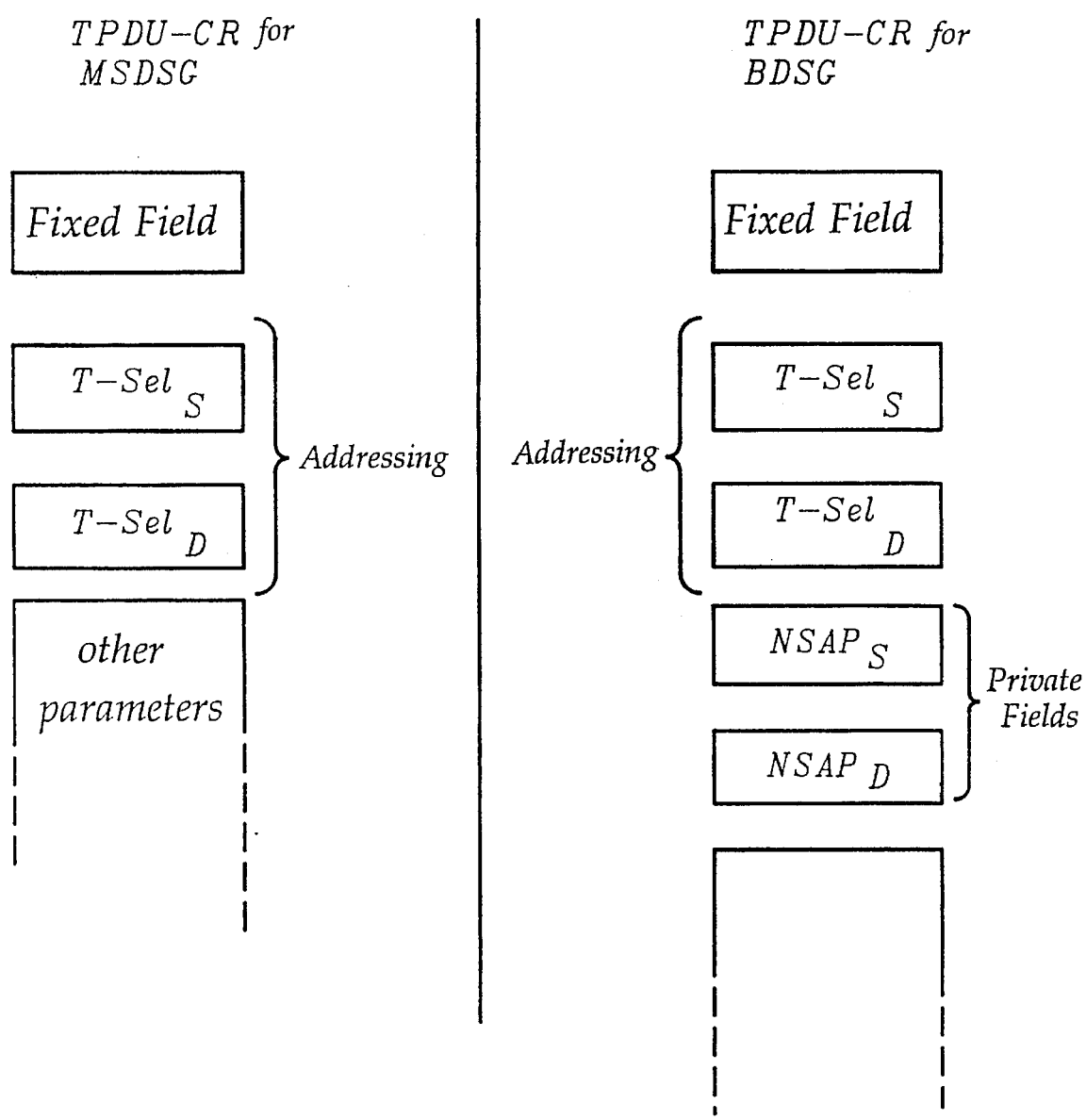
FIG. 7 shows how the TPDU-CR-type connection requests are composed, respectively, on one hand for the MSDSG-type transport relay according to the prior art, and on the other hand for the BDSG-type transport relay in the invention.

According to the invention, the transport relay system using the SRI relay operates by using the following two aspects simultaneously:

1. From the sessions (that is, for communication from session SS to session SD), the transport protocol, i.e., end to end, uses the value of the transport service access points $TSAP_S$ and $TSAP_D$. This is done at the level of the connection request TPDU-CR, and includes, on one hand, the values of the transport selectors $T\text{-}Sel_S$ and $T\text{-}Sel_D$ (like the connection requests TPDU-CR used by the relay in the prior art that was MSDSG type, as can be seen in FIG. 7), and, on the other hand, in the private fields, provided and authorized by the standard (ISO8073, a component of the OSI reference model), the addresses of the access points to the network service of the source and target systems SS and SD, that is, $NSAP_S$ and $NSAP_D$. It can be seen that the values of TSAP formed by the combination of the values of T-Sel and NSAP are found in the connection request used in the BDSG-type relay according to the invention.

These values of TSAP, as can be seen in FIG. 6, are transported from end to end, without modification, within the transport protocol.

2. From the transport layer, communication from the source system session to the target system session also uses the NSAP addresses of the SRI relay (this is true no matter what the number of relays). This SRI address is termed $NSAP_R$.

Referring to FIG. 6, we can see that in the CONS-type network, between SS and SRI, SRI receives the value of $NSAP_R$, which is sent to it by the network service, and interprets it (via the OSI reference model) as meaning that it is its own transport entity which is concerned. SRI then interprets the values of TSAP given to it by the transport entity within the open connection request TPDU-CR, and then goes to look in the private parameters for the address of the network service access point of the target system $NSAP_D$ to extend the connection to the target system SD. Thus, if we refer to FIG. 8, we can see what happens at the level of the source system SS, and in the BDSG-type transport relay SRI according to the invention and compare it with what happens in the source system and in the MSDSG-type transport relay SRA according to the prior art.

In the relay system in the invention, therefore, the value of $TSAP_D$ is given in the request to open the connection TPDU-CR. There is therefore a pair of values $T\text{-}Sel_D$ and $NSAP_D$. From this pair of values, we extract the value of $NSAP_D$, to which a value of $NSAP_R$ in the first relay corresponds, which is found between SS and SD on the routing path chosen, here the relay SRI (which is, hypothetically, the only relay between the source system and the target system, but there could of course be several relays between SS and SD). The correspondence between the value of $NSAP_D$ and $NSAP_R$ is in a table contained in the systems SS and SD, and in the relay(s) on any one of the routes that the information can take between SS and SD. This table is known to the expert by its acronym RIB (Routing Information Base, which is a routing database that is defined beforehand by the user of the source system) defining the relations between the address of NSAP and the physical output paths. This RIB table is extended to contain the correspondence between $NSAP_D$ and $NSAP_R$. Of course, once the value of $NSAP_R$ is deduced from the value of $NSAP_D$, the connection request TPDU-CR can be transported from SS to SD via SRI.

Figure 8:
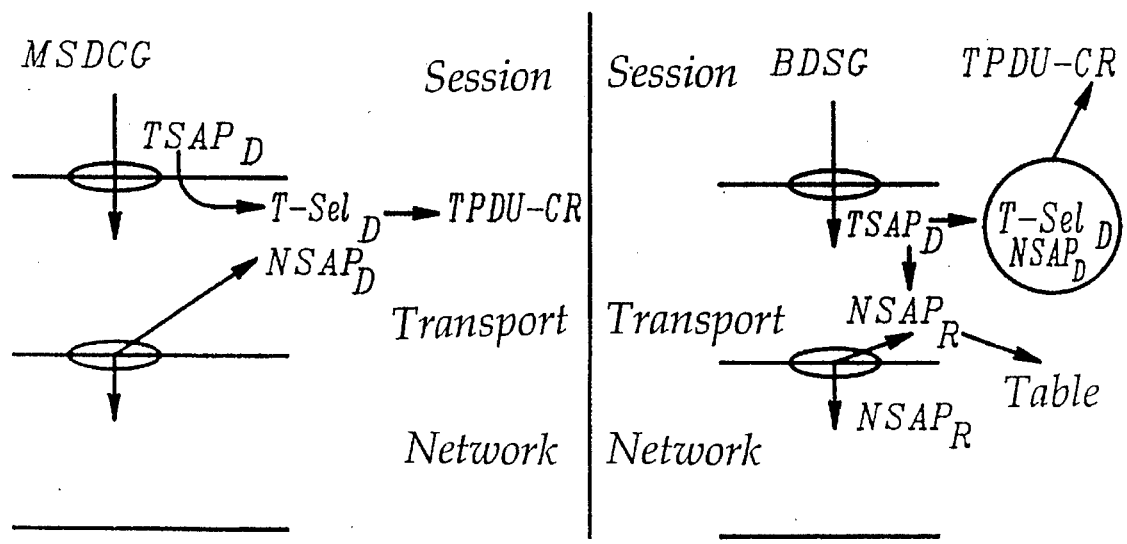
FIG. 8 shows in greater detail what happens at the level of the transport service addresses and the network services addresses for layers 3, 4, 5 or the MSDSG and BDSG-type transport relay systems, respectively, according to the prior art and according to the invention.

In the system according to the prior art, as can be seen in FIG. 8, only the value of $T\text{-}Sel_D$ is sent in the open connection request TPDU-CR, and that is the value of $NSAP_D$ that is used by the network service all along the path taking the information from SS to SD via the relay SRA.

Details of the operation of the transport relay system in the invention are given by Tables I, II, III, which are appended to the end of the description.

Please refer also to FIGS. 6 and 7.

1) As regards what happens in the initiating system SS, as indicated in Table I:

The connection request TPDU-CR includes the addresses of the transport service access points of the source and target systems, namely $TSAP_S$ and $TSAP_D$, which are also designated by the names TSAP calling and TSAP called. As was stated earlier, each of these TSAP addresses is broken down into a transport selector value $T\text{-}Sel_S$ and $T\text{-}Sel_D$; these NSAP addresses were in the private parameters of the connection request TPDU-CR. Using the table of correspondence in its RIB, the initiating system deduces the NSAP address from the relay, namely $NSAP_R$. Thus the NSAP addresses used in the network interface by the initiating system are $NSAP_S$ and $NSAP_R$, respectively.

2) As regards what happens in the relay system SRI, as indicated in Table II:

The connection request received by the relay system SRI is obviously strictly identical to the connection request TPDU-CR sent by the initiating system SS, as can be seen by comparing Tables I and II. Similarly, the NSAP addresses received at the network interface of the relay system SRI are those used in the network interface of the initiating system SS, i.e., $NSAP_S$ and $NSAP_R$. The relay SRI performs the routing at the level of its transport service, using the addresses of $TSAP_S$ and $TSAP_D$. At the level of its network service, it uses its own address $NSAP_R$ as a value of NSAP calling. From its own table of correspondences RIB, it deduces from the value of $NSAP_D$ read in the connection request the NSAP address that it should use in its network interface, here $NSAP_D$. If it were necessary to use another relay system besides SRI, namely $SRI_1$, the value of the NSAP called would be $NSAP_{R1}$.

3) As regards what happens in the target system SD, as shown in Table III:

The connection request received is strictly identical to the connection request TPDU-CR sent by the relay system SRI (Table II). Similarly, the NSAP addresses received at the network interface are the NSAP addresses used in the network interface by the relay system SRI, that is, $NSAP_R$ and $NSAP_D$. By comparing the value of $NSAP_D$ received at the network interface and the value of $NSAP_D$ contained in the private parameters of the connection request TPDU-CR, the system SD deduces that it is the real target of the connection request and its transport service transmits the information to the session that corresponds to it.

Going from SD to SS, the system SD sends a connection confirmation TPDU-CC to the system SS, following a process similar to the one described above.

TABLE I

CONNECTION REQUEST
address of TSAP called: ($NSAP_D$, T-$Sel_D$)      } "real" addresses
address of TSAP calling: ($NSAP_S$, T-$Sel_S$)     }
    processing use of specific NSAP and private parameters
↓
1. NSAP addresses used in network interface:
    - NSAP calling = $NSAP_S$
    - NSAP called = $NSAP_r$
2. in the TPDU-CR sent:
    - T-Sel calling: T-$Sel_S$
    - T-Sel called: T-$Sel_D$
    - Private parameter: real NSAP calling = $NSAP_S$
    - Private parameter: real NSAP called = $NSAP_D$

TABLE II

CONNECTION REQUEST
Routing on real called NSAP
↓

↑ - address of TSAP called ($NSAP_D$, T-$Sel_D$)     } "real" addresses
   - address of TSAP calling ($NSAP_S$, T-$Sel_S$)    }
   - Relay indication: NSAP calling to be used:    $NSAP_r$
INDICATION OF CONNECTION
    processing the decoding and comparison:
    NSAP called Network = Real NSAP called
in the TPDU-CR received:    in the TPDU-CR sent:
  - T-Sel calling: T-$Sel_S$    T-Sel calling: T-$Sel_S$
  - T-Sel calling: T-$Sel_D$    T-Sel called: T-$Sel_D$
  - Real NSAP calling = $NSAP_S$    Real NSAP calling = $NSAP_S$
  - Real NSAP called = $NSAP_D$    Real NSAP called = $NSAP_D$
NSAP addresses received at network interface:    NSAP addresses used at
network interface    Network interface:
  - NSAP calling = $NSAP_S$    - NSAP calling = $NSAP_r$
  - NSAP called = $NSAP_r$      - NSAP called = $NSAP_D$
    or other $NSAP_{r1}$ if other relay

TABLE III

- address of TSAP called: ($NSAP_D$, T-$Sel_D$)     } "real" addresses
- address of TSAP calling: ($NSAP_S$, T-$Sel_S$)    }
INDICATION OF CONNECTION
    processing the decoding and comparison:
    NSAP called Network = Real NSAP called
in the TPDU-CR received:
- T-Sel calling: T-$Sel_S$
- T-Sel called: T-$Sel_D$
- real NSAP calling: $NSAP_S$
- real NSAP called: $NSAP_D$
NSAP addresses received at network interface:
    - NSAP calling = $NSAP_r$
    - NSAP called = $NSAP_D$

I claim:

1. In a system of at least one OSI transport relay, a method for ensuring cooperation between at least a first system containing at least one source system (SS), using an OSI transport profile based on a network service in so-called CONS connected mode and at least a second system including at least one target system (SD) using an OSI transport profile based on a network service in so-called CLNS non-connected mode, comprising the steps of:

routing the information on the transport layer using transport selector values (T-Sel) for the source and target systems (T-$Sel_S$ and T-$Sel_D$, respectively); and using the addresses of network service access points (NSAP) of the source and target systems, characterized by the fact that the addresses of the transport service access points (TSAP), source and target systems (TSAP$_S$ and TSAP$_D$, respectively) are transported end to end by the transport layer transparently and without modification, within connection requests (TPDU-CR), the addresses of the network service access points used by the network service being those of the source system and a relay system ($NSAP_S$ and $NSAP_D$, respectively).

2. A method according to claim 1 characterized by the fact that the addresses of the transport service access points of the source and target systems include the values of the transport selectors T-$Sel_S$ and T-$Sel_D$ of those same systems.

3. A method according to one of claims 1, 2, characterized by the fact that the addresses of the transport service access points include the addresses of the network service access points of the same systems $NSAP_S$, $NSAP_D$ which are contained in private fields authorized by the OSI reference model.

4. A method according to claim 3, characterized by the fact that the source system (SS), the relay (SRI) and the target system each has a table of correspondence between the value of the network service access point $NSAP_D$ of the target system (SD) and that of the relay (SRI).

5. A process for implementing the method according to claim 4, characterized by the fact that a. the source system (SS) includes in the connection request TPDU-CR the addresses of the access points TSAP$_S$ and TSAP$_D$ of the source and target systems, with the addresses of the corresponding network service access points $NSAP_S$ and $NSAP_D$ contained in the private parameters of the connection request, b. the relay SRI receives the connection request, and its network interface receives the addresses $NSAP_S$ and $NSAP_R$ c. the relay (SRI) performs the routing at the level of its transport service by using the addresses of $TSAP_S$ and $TSAP_D$ and deduces from said table of correspondences the address that it should use in the network interface, from the value of $NSAP_D$, d. the target system (SD) receives the connection request TPDU-CR and the addresses $NSAP_S$ and $NSAP_R$ at its network interface, e. it compares the value $NSAP_S$ in its network interface and the value of $NSAP_D$ received in the connection request, f. the target system (SD) sends the source system a connection confirmation TPDU-CC in accordance with process steps (a) through (e), above.

* * * * *

UNITED STATES PATENT AND TRADEMARK OFFICE
CERTIFICATE OF CORRECTION

PATENT NO. : 5,570,359

DATED : October 29, 1996

INVENTOR(S) :
VanPhuong Nguyen

It is certified that error appears in the above-indentified patent and that said Letters Patent is hereby corrected as shown below:

Column 8, line 40, "NSAP", should read --NSAPs--.

Column 9, TABLE I, center top, before data insert "APPENDIX", and --In the source system SS--.

Column 9, TABLE II, center top, before "Connection Request", should read --In the Relay System SRI--.

Column 9, TABLE III, center top, before data, should read --In the target system SD--.

Signed and Sealed this

Thirty-first Day of March, 1998

*Attest:*

BRUCE LEHMAN

*Attesting Officer*     *Commissioner of Patents and Trademarks*